US011117308B2

(12) United States Patent
Hellouin et al.

(10) Patent No.: US 11,117,308 B2
(45) Date of Patent: Sep. 14, 2021

(54) HALF-MOULD HAVING A CYLINDRICAL ASSEMBLY FACE AND PRODUCTION METHOD

(71) Applicant: SIDEL PARTICIPATIONS, Octeville-sur-Mer (FR)

(72) Inventors: Damien Hellouin, Octeville-sur-Mer (FR); Olivier Alix, Octeville-sur-Mer (FR); Alexandre Toutoux, Octeville-sur-Mer (FR); Cedric Bianchini, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/957,094

(22) PCT Filed: Dec. 11, 2018

(86) PCT No.: PCT/FR2018/053197
§ 371 (c)(1),
(2) Date: Jun. 22, 2020

(87) PCT Pub. No.: WO2019/122596
PCT Pub. Date: Jun. 27, 2019

(65) Prior Publication Data
US 2020/0346391 A1 Nov. 5, 2020

(30) Foreign Application Priority Data
Dec. 22, 2017 (FR) ...................... 1762929

(51) Int. Cl.
*B29C 49/48* (2006.01)
*B29C 33/38* (2006.01)
(Continued)

(52) U.S. Cl.
CPC .......... *B29C 49/48* (2013.01); *B29C 33/3842* (2013.01); *B29C 49/36* (2013.01);
(Continued)

(58) Field of Classification Search
CPC ............ B29C 49/48; B29C 2049/4882; B29C 2049/4892; B29C 2049/4897; B29C 33/3842; B29C 49/36
See application file for complete search history.

(56) References Cited

U.S. PATENT DOCUMENTS

| 4,199,129 A | 4/1980 | Fischer |
| 2009/0028976 A1 | 1/2009 | Dannebey et al. |

(Continued)

FOREIGN PATENT DOCUMENTS

| DE | 2720448 B1 | 7/1978 |
| EP | 2111967 A1 | 10/2009 |

OTHER PUBLICATIONS

International search report dated Apr. 11, 2019.

*Primary Examiner* — Robert B Davis

(57) ABSTRACT

The invention relates to a half-mold comprising a joint face; an opposing assembly face), where the longitudinal cross-section of the assembly face is in the form of an arc of a circle centered on a reference axis. The reference axis is offset longitudinally towards the front relative to the joint face. The invention also concerns a molding assembly, a molding unit and a forming facility comprising such half-molds. The invention also concerns a method for producing such half-molds and a method for producing a surface for receiving such half-molds.

22 Claims, 6 Drawing Sheets

(51) Int. Cl.
 *B29C 49/36* (2006.01)
 *B29K 23/00* (2006.01)
 *B29K 67/00* (2006.01)
 *B29L 31/00* (2006.01)

(52) U.S. Cl.
 CPC .......... *B29C 2049/4882* (2013.01); *B29C 2049/4892* (2013.01); *B29C 2049/4897* (2013.01); *B29K 2023/12* (2013.01); *B29K 2067/003* (2013.01); *B29L 2031/7158* (2013.01)

(56) References Cited

U.S. PATENT DOCUMENTS

| | | | |
|---|---|---|---|
| 2009/0263535 A1* | 10/2009 | Tonga | B29C 33/30 425/522 |
| 2011/0052743 A1* | 3/2011 | Langlois | B29C 33/306 425/182 |
| 2013/0043622 A1* | 2/2013 | Hoellriegl | B29C 49/48 264/572 |

* cited by examiner

HALF-MOULD HAVING A CYLINDRICAL ASSEMBLY FACE AND PRODUCTION METHOD

The invention relates to a half-mold for forming containers made of thermoplastic material of vertical orientation axis, notably by blow-molding or stretch blow-molding, the half-mold comprising:
a planar vertical transverse front joint face provided with a molding half-cavity;
an opposing vertical assembly face.

TECHNICAL BACKGROUND OF THE INVENTION

It is known practice to mass-produce containers, notably bottles, made of thermoplastic materials by blow-molding or stretch blow-molding preforms. To this end, the hot preforms are inserted into molding units having a molding cavity of the form of the container to be obtained.

In order to make it possible to mass-produce the containers, several molding units are arranged on a main wheel forming a rotary carousel of a forming installation. This makes it possible to successively form several containers as they move between a point of entry and a point of exit.

In the manufacturing phase, the preforms are brought to a molding unit of the forming installation with which there are associated forming means based on the application of at least one fluid under pressure, gaseous and/or liquid, in the preform. The forming of the preform is for example obtained by blow-molding or stretch blow-molding by means of a gas under pressure, such as air.

In a forming installation with rotary carousel, each molding unit comprises at least one molding assembly equipped with a molding cavity. The molding assembly is produced in at least two half-molds each bearing a die of half the molding cavity. The half-molds are borne by two associated mold supports. The mold supports are mobile between an open position in which the two half-molds are separated to allow the extraction of a molded container and the introduction of a preform, and a closed position in which the two half-molds occupy a joined position to reconstruct the molding cavity.

The two mold supports are mounted to pivot relative to one another, articulated by a vertical hinge. Such a molding unit is also known as "folding mold".

The manufacturers of containers are often required to change the model of containers produced. Such is particularly the case for the manufacturers who produce containers or bottles intended to contain cleaning or hygiene products, called "home personal care" products. To allow this change of model, it is known practice to design molding units that make it possible to easily and rapidly replace the elements of the molding assembly comprising the cavity.

It is commonplace for some containers, called oblong containers hereinbelow, produced in this field to have a cross section of oblong form. Furthermore, some containers of large size have a very large content, for example of the order of several liters. Such is for example the case for some bottles intended to contain lye.

The molding units are therefore expected to allow the production of oblong containers of large size. For the carousel to be able to bear a fairly high number of molding units, for example ten or so, while remaining fairly compact, it is known practice to produce molding units comprising so-called "elliptical" molding assemblies. These elliptical molding assemblies have, in longitudinal cross section, an outline of oval form.

A closed oval curve is defined as being a continuous curve which has, at all points, one and only one straight tangent line. An oval form as defined in this application has two orthogonal axes of symmetry. Hereinbelow, the segment which extends in the lengthwise direction of the oval along the first axis of symmetry will be called large diameter D1, and the segment which extends in the narrowest direction of the oval along the second axis of symmetry will be called small diameter D2. An ellipse is therefore a particular oval according to the present definition.

FIG. 1 shows such an elliptical molding assembly produced according to the state of the art.

The molding assembly 10 has two single-piece half-molds 12A, 12B which are each borne by an associated mold support (not represented). Since the two half-molds 12A, 12B are identical by symmetry relative to a joint plane 16, only the left-hand half-mold 12A will be described, the description being applicable to the right-hand half-mold 12B by symmetry.

Thus, the half-mold 12A is delimited longitudinally toward the front by a planar vertical transverse front joint face 18 which is provided with a molding half-cavity 20. The joint face 18 extends in the joint plane 16. In a joined position, the two half-molds 12A, 12B are intended to be joined by pressing their respective joint faces 18 longitudinally against one another to reconstitute the molding cavity 20, as represented in FIG. 1.

The half-mold 12A is also delimited longitudinally toward the back by an opposing vertical assembly face 22. The assembly face 22 has, in longitudinal cross section, a convex curved form. The assembly face 22 is intended to be housed in a complementary reception face of an associated mold support (not represented). The assembly face 22 generally has a cylindrical form formed by the translation of a vertical generatrix straight line onto the directrix curve, formed by the curved form of the assembly face 22 in longitudinal cross section represented in FIG. 1.

As is known, the assembly face 22 has, in longitudinal cross section, the form of a half-oval. In joined position, the assembly faces 22 of the two half-molds 12A, 12B therefore form a complete oval. The large diameter D1 extends here in the joint plane 16. In other words, in a transverse longitudinal plane cutting the half-mold 12A, each transverse end of the assembly face 22 has a tangential straight line "d" which extends at right angles to the joint plane 16. Furthermore, the half-radius, forming half the small diameter D2, which extends longitudinally between the assembly face 22 to the joint face 18 of the half-mold 12A has a length less than half the length of the large diameter D1 which extends between the two transverse ends of the assembly face 22.

Such a molding assembly 10 produced according to the state of the art advantageously makes it possible to produce oblong containers of large size by reducing the longitudinal bulk of the molding assemblies compared to molding assemblies that have, in section, a circular outline.

However, the assembly face 22 of the half-molds 12A, 12B is complex to produce. Indeed, each half-mold 12A, 12B is generally obtained by molding. The assembly face then has the raw appearance of the so-called rough casting surfaces. It is therefore necessary to machine the assembly face 22 to make it functional. The machining of a surface having a half-oval profile is done by milling. Such a method is lengthy and costly, notably because of the dimensions of the half-mold.

Furthermore, the same milling operation has to be used to produce the reception faces of the mold support. Because of the variable radius of curvature of the reception face, the mill used must have a diameter that is smaller than the smallest radius of curvature of the reception face. The use of a mill of small size for the machining of this reception face increases the time, and therefore the cost, involved in manufacturing the mold support.

BRIEF SUMMARY OF THE INVENTION

The invention proposes a half-mold for forming containers made of thermoplastic material of vertical axis of orientation, notably by blow-molding or stretch-blow-molding, the half-mold comprising:
 a planar vertical transverse front joint face provided with a molding half-cavity;
 a vertical assembly face that is opposite, in the longitudinal direction, the joint face and has a convex curve, the assembly face being intended to be housed in a complementary reception face of an associated mold support;
 characterized in that, in longitudinal cross section, the assembly face takes the form of a circular arc centered on a reference axis, said reference axis being offset longitudinally forward relative to the joint face.

According to other features of the half-mold produced according to the teachings of the invention:
 the assembly face comprises several vertical sections that take the form of a cylinder segment centered on the reference axis;
 the assembly face has, in longitudinal cross-section, a transverse chord extending in the plane of the joint face linking the free transverse ends of the assembly face; and a longitudinal bisector passing through the center of the chord and of a length less than half that of the chord, a central vertical axis of the half-mold passing through the intersection between the chord and the bisector; the reference axis being arranged in a plane including the bisector;
 the reference axes of each section of assembly face are mutually coaxial;
 at least two sections of assembly face have different radii of curvature;
 the half-mold is a single piece;
 the half-mold is produced in two parts:
  an inner shell which is delimited longitudinally a front face forming the joint face of the half-mold and by a rear face, opposite the joint face, and forming a mounting face of convex form;
  an outer shell-holder which is delimited longitudinally by a front reception face of a form complementing that of the mounting face and in which the mounting face of the shell is housed and by an opposite rear face which forms the assembly face of the half-mold;
 in longitudinal cross section, the mounting face of the shell takes the form of a circular arc centered on a reference axis;
 the reference axis of the mounting face is coaxial to the central axis included in the plane of the joint face;
 the reference axis of the mounting face is offset longitudinally forward relative to the joint face;
 the mounting face of the shell comprises several vertical sections in the form of a cylinder segment centered on the reference axis of the mounting face;
 the reference axis is arranged in a plane including the longitudinal bisector;
 the reference axes of each section of mounting face are mutually coaxial;
 at least two sections of mounting face have different radii of curvature;
 the reference axes of the sections of mounting face and the reference axes of the sections of assembly face are all coaxial to a common axis;

The invention relates also to a molding assembly comprising a pair of half-molds produced according to the teachings of the invention, characterized in that the two half-molds of the pair comprise two complementary half-cavities to form a cavity that conforms to the final container to be obtained when the two half-molds occupy a joined position in which their two joint faces are pressed longitudinally against one another;

According to another feature of the molding assembly produced according to the teachings of the invention, the two half-molds have a structure that is substantially identical by symmetry relative to a joint plane passing through the joint faces in joined position of the two half-molds;

The invention relates also to a molding unit comprising two mold supports, each of which is intended to receive one of the half-molds of a molding assembly produced according to the teachings of the invention, the mold supports being mounted to be mobile relative to one another between an open position, in which the joint faces of the half-molds are separated, and a closed position in which the half-molds occupy their joined position, characterized in that each mold support comprises a reception face of a form complementing the assembly face of the associated half-mold.

According to another feature of the molding unit according to the teachings of the invention, the two mold supports are mounted to pivot relative to one another about a vertical hinge axis, the joint plane of the half-molds passing through the hinge axis.

The invention relates also to an installation for forming thermoplastic containers by forming, and notably by blow-molding or stretch-blow-molding, comprising a main wheel mounted to rotate about a central axis of rotation and comprising, at its periphery, a plurality of molding units produced according to the teachings of the invention, characterized in that the joint plane of the half-molds of each molding unit passes through the central axis of rotation of the main wheel.

The invention relates also to a method for machining the outer faces of a pair of molding elements of a molding assembly produced according to the teachings of the invention, from among the mounting faces of the shells or the assembly faces of the shell-holders or the assembly faces of the single-piece half-molds, the molding elements being obtained by casting, characterized in that the molding elements of the pair are mounted on a machining spacer mounted to rotate on a machining lathe about a machining axis, so that the reference axes of the sections to be machined coincide with the machining axis.

The invention also relates to a method for machining the reception face of a mold support produced according to the teachings of the invention, or the inner reception face of a shell-holder produced according to the teachings of the invention, characterized in that each section of said inner face is machined by means of a cutting tool rotating about a machining axis which coincides with the reference axis of said section, the cutting tool having a radius which is equal to the radius of curvature of said section.

BRIEF DESCRIPTION OF THE FIGURES

Other features and advantages of the invention will become apparent from reading the following detailed description, for an understanding of which reference will be made to the attached drawings in which.

DETAILED DESCRIPTION OF THE FIGURES

In the description and in the claims, elements that have an identical structure or similar functions will be designated by one and the same reference.

In the description and in the claims, an orthogonal reference frame will be adopted, but in a nonlimiting manner, that is associated with each half-mold and having the following orientations:

longitudinal "L" directed from back to front toward the other half-mold in joined position;

transverse "T" directed from left to right;

vertical "V" directed from bottom to top, the vertical direction being independent of the direction of gravity.

Figure 1:
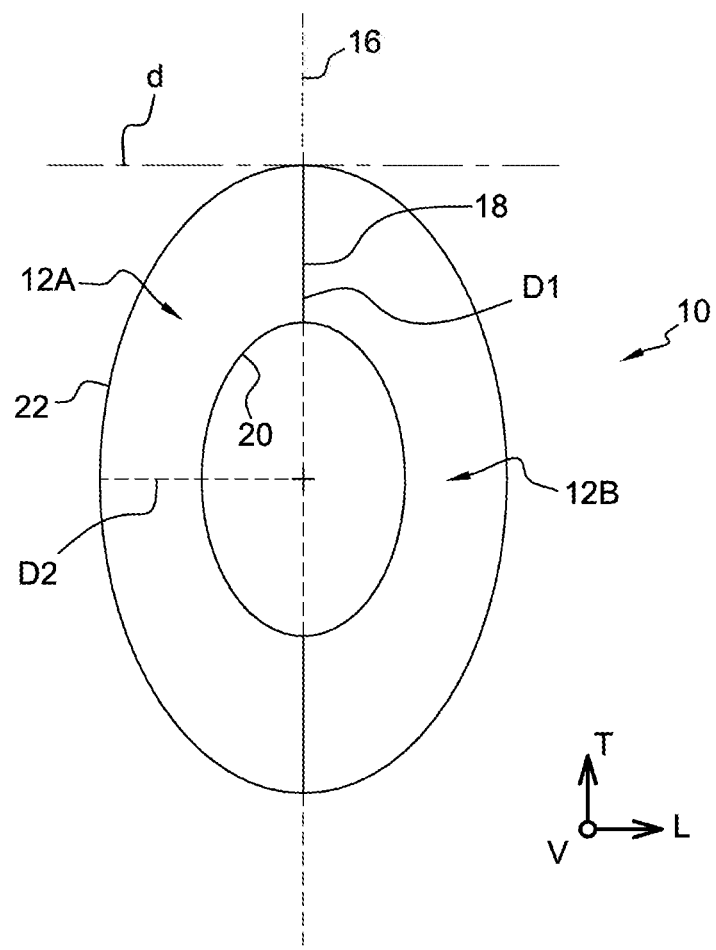
FIG. 1 is a view in longitudinal cross-section which represents an elliptical molding assembly produced according to the state of the art.
Figure 2:
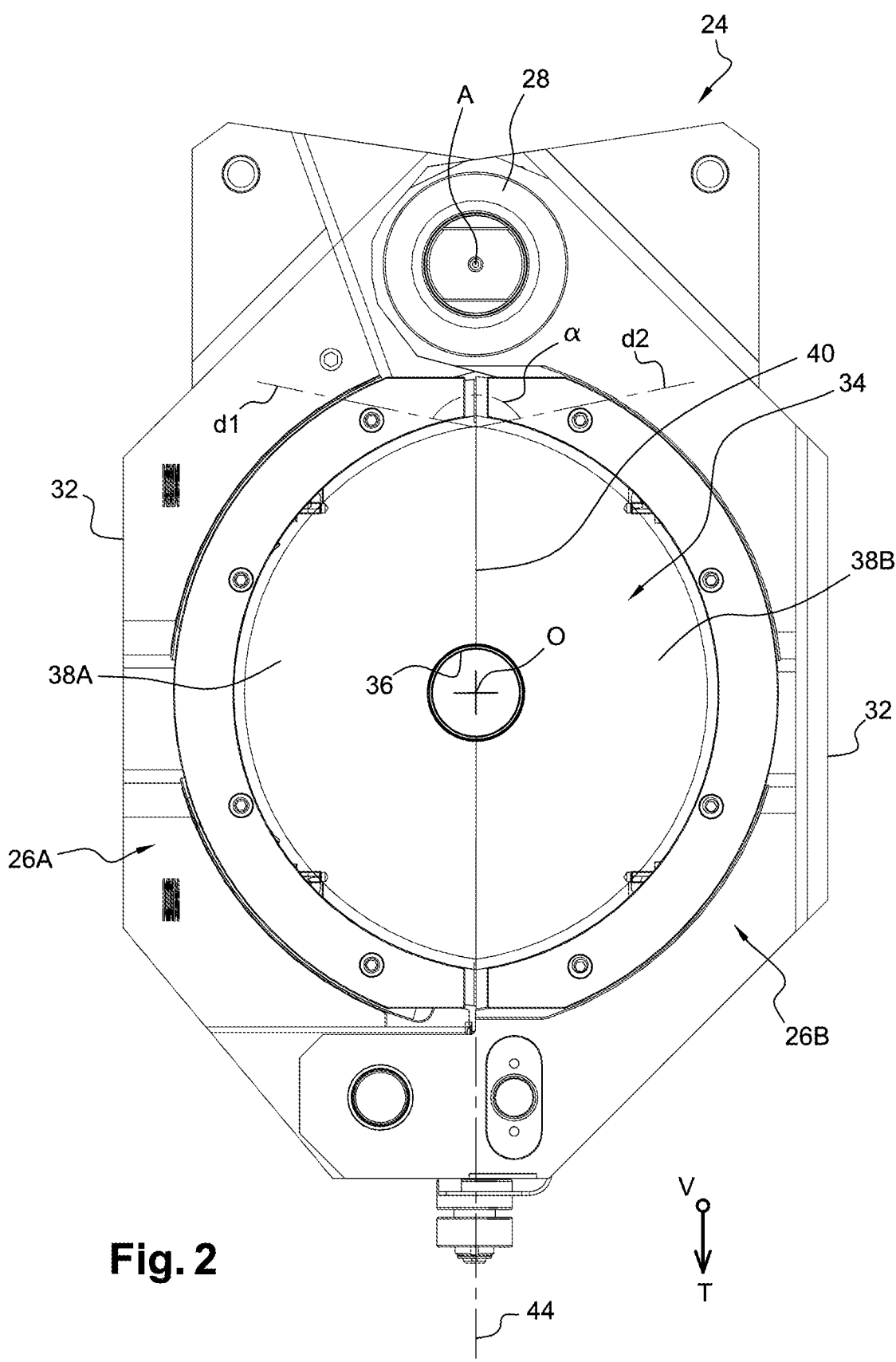
FIG. 2 is a plan view which represents a molding unit comprising a molding assembly produced according to a first embodiment of the invention, the half-molds of the molding assembly being in joined position.
Figure 3:
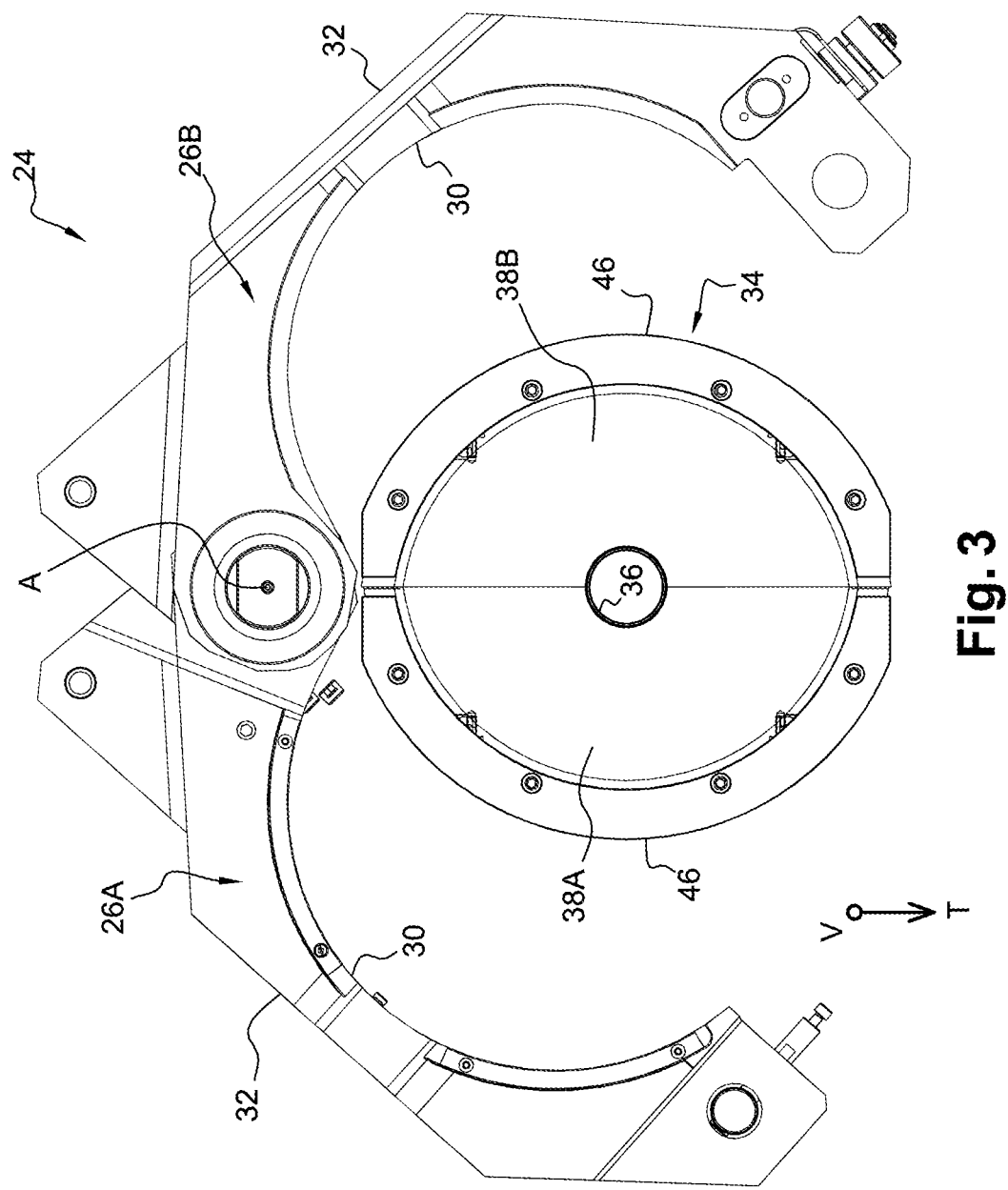
FIG. 3 is a view similar to that of FIG. 2 in which the mold supports are in open position while the half-molds are removed from the mold supports and they occupy their joined position.

FIGS. 2 and 3 show a molding unit 24 for manufacturing containers made of thermoplastic material, notably of polyethylene terephthalate (PET) or of polypropylene (PP), that are of vertical axis of orientation by blow-molding a preform (not represented).

The molding unit 24 comprises two mold supports 26A, 26B which are mounted to be mobile between a closed position, represented in FIG. 2, and an open position, represented in FIG. 3. In the example illustrated in the figures, the two mold supports 26A, 26B are mounted to pivot relative to one another about a vertical axis "A" of a hinge 28 arranged along a transverse end edge of the mold supports 26A, 26B. Such an arrangement is generally called "folding mold".

Although the invention is particularly advantageous with a folding mold, it is also applicable to mold supports that are translationally mobile relative to one another.

Each mold support 26A, 26B is delimited longitudinally by a vertical front reception face 30 and by a vertical rear face 32, as is for example visible in FIG. 3. The reception face 30 of each mold support 26A, 26B is turned toward the other mold support 26A, 26B when they occupy their closed position.

The molding unit 24 also comprises a molding assembly 34 which has a molding cavity that takes the form of the container to be obtained by blow-molding. The cavity opens vertically upward through an orifice 36 intended to receive a container.

The molding assembly 34 comprises at least one pair of complementary half-molds 38A, 38B. As is particularly visible in FIG. 4, each half-mold 38A, 38B has a transverse vertical front joint face 40 in which a molding half-cavity 42 is formed. When the two half-molds 38A, 38B occupy a joined position, as illustrated in FIG. 2, the two half-molds 38A, 38B are pressed against one another by their respective joint face 40 for their half-cavities 42 to reconstruct the molding cavity. The joint faces 40 then extend in a transverse vertical joint plane 44.

Figure 4:
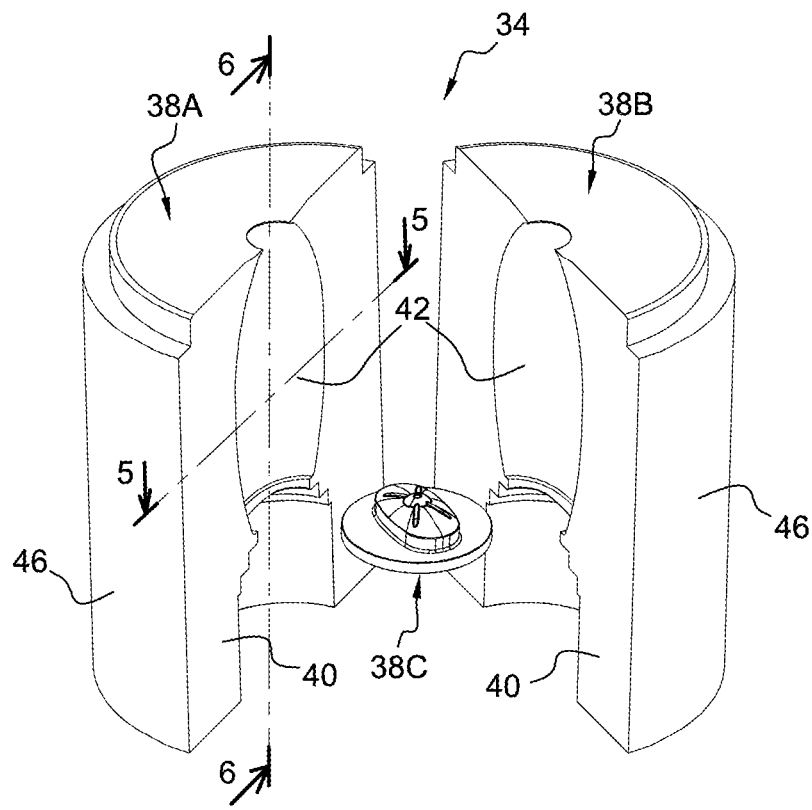
FIG. 4 is a perspective view which represents two half-molds of a molding assembly produced according to a first embodiment of the invention.

In the embodiment represented in FIG. 4, the molding assembly 34 also comprises a bottom 38C that is distinct from the half-molds 38A, 38B. Thus, each half-mold 38A, 38B is designed to form the body of the container, whereas the bottom 380 is designed to form the bottom of the container.

In a variant that is not represented, the molding assembly comprises only two half-molds. The die of each half-mold is then designed to form the body and the bottom of the container.

Referring once again to FIG. 4, each half-mold 38A, 38B also has a vertical rear assembly face 46 opposite the joint face 40. The assembly face 46 here takes the form of a cylinder segment whose directrix and generatrix will be defined in more detail hereinbelow.

Each half-mold 38A, 38B is mounted in an associated mold support 26A, 26B by positioning its assembly face 46 against the associated reception face 30 of the mold support 26A, 26B as represented in FIG. 2. To this end, the reception face 30 has a form that complements that of the assembly face 46 of the associated half-mold 38A, 38B. Each half-mold 38A, 38B is assembled with its associated mold support 26A, 26B by any assembly means already known in the field of molding units with interchangeable molding cavity.

In the closed position of the mold supports 26A, 26B, the half-molds 38A, 38B occupy their joined position, while in open position, the joint faces 40 of the half-molds 38A, 38B are separated from one another.

Opposite the hinge 28, the mold supports 26A, 26B are provided with a closed position locking mechanism.

The two half-molds 38A, 38B are substantially identical by symmetry relative to the joint plane 44. The term "substantially" means that the two half-molds 38A, 38B can be differentiated by certain minor details, such as the presence of orifices or of grooves in the assembly face 46 of one or other of the two half-molds which might be absent from the other. This notably the case when one of the half-molds is floatingly mounted on its mold support with the insertion of a compensation chamber while the other half-mold is fixedly mounted on its mold support. Nevertheless, these slight structural differences are intended to be produced downstream of the machining operation of the assembly faces 46 which will be described in more detail hereinbelow in the description.

For this reason, only one of the two half-molds will be described hereinbelow, in this case the half-mold 38A represented on the left in FIG. 2, the description being applicable by symmetry to the other half-mold 38B.

According to the teachings of the invention, the assembly face 46 of the half-mold 38A has, in longitudinal cross section, the form of a circular arc centered on a reference axis "X", said reference axis "X" being offset longitudinally forward relative to the joint face 40 by a distance "s".

Figure 5:
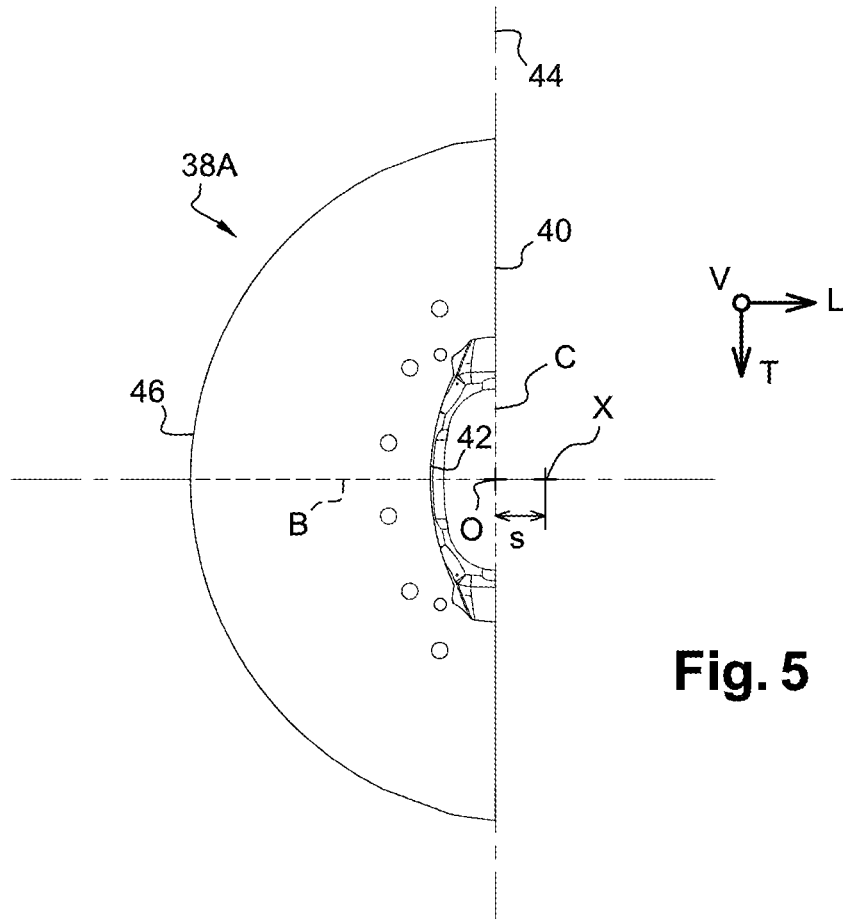
FIG. 5 is a view in longitudinal cross-section along the cutting plane 5-5 of FIG. 4, which represents a half-mold produced according to the teachings of the invention.

Thus, as represented by broken lines in FIG. 5, the assembly face 46 having, in longitudinal cross-section:

a transverse chord "C" which is a virtual segment which extends in the linking joint plane 44 and which links the free transverse ends of the assembly face 46; and a longitudinal bisector "B" which is a virtual segment extending from the center of the chord "C" to the assembly face 46.

The bisector "B" forms the single longitudinal axis of symmetry for the assembly face 46 of the half-mold 38A in cross-section as represented in FIG. 5.

Because of the offset of the reference axis "X" relative to the joint face 40, the length of the bisector "B" is less than half the length of the chord "C".

Also, axis "O" denotes central vertical axis of the half-mold 38A, the axis "O" passing through the intersection between the chord "C" and the bisector "B" for the vertical cross-sections of the half-mold 38A produced at different heights.

The reference axis "X" is preferably arranged in a plane including the bisector "B".

Figure 6:
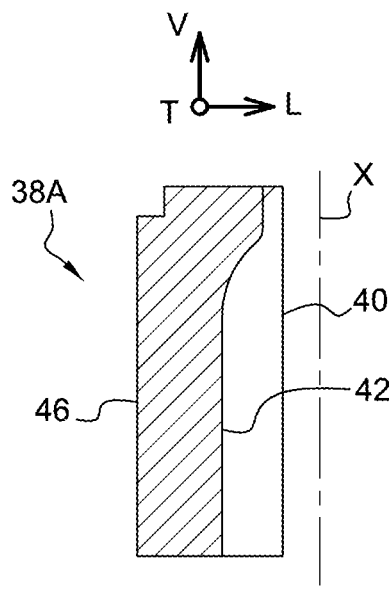
FIG. 6 is a view in longitudinal cross-section along the cutting plane 6-6 of FIG. 4 which represents a half-mold produced according to the teachings of the invention.

As is represented in FIG. 6, the assembly face 46 can have, overall, the form of a segment of a cylinder of revolution centered on the axis "X". In this case, the vertical cross sections of the assembly face 46 are substantially identical in form and in dimensions regardless of the height at which they are taken. In the example represented in FIG. 6, it is the segment of a cylinder of revolution. In this case, the half-mold 38A comprises a single reference axis "X" that is common to all the cross-sections.

Figure 7:
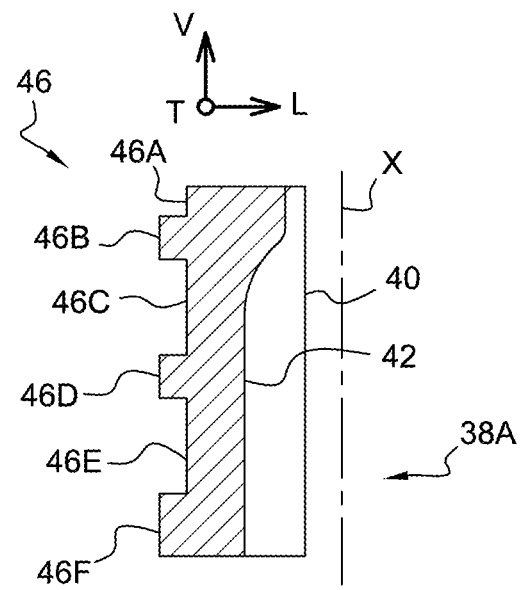
FIG. 7 is a view similar to that of FIG. 6 which represents a variant embodiment of the half-mold.

In the production variant represented in FIG. 7, the assembly face 46 comprises several vertical sections 46A to 46F, here six of them, in the form of a segment of cylinder centered on the reference axis "X". In this case, the vertical cross-sections of the assembly face 46 are substantially identical in form, but they can differ in dimensions depending on the height at which they are taken. In the example represented in FIG. 7, each section 46A to 46F forms a segment of cylinder of revolution.

Preferably, the reference axes "X" of each section 46A to 46F of assembly face 46 are mutually coaxial. Thus, as represented in FIG. 7, the half-mold 38A comprises a single reference axis "X" that is common to all the cross-sections. Because of this, at least two sections 46A, 46B of assembly face 46 have different radii of curvature.

According to a variant of the invention that is not represented, when the assembly face comprises several vertical sections, at least two vertical sections each have non-coaxial reference axes.

In a variant of the invention that is not represented, it will be understood that a vertical section or all of the assembly face can take the form of an angular segment of any axisymmetrical volume centered on the reference axis "X", such as a frustum.

Figure 8:
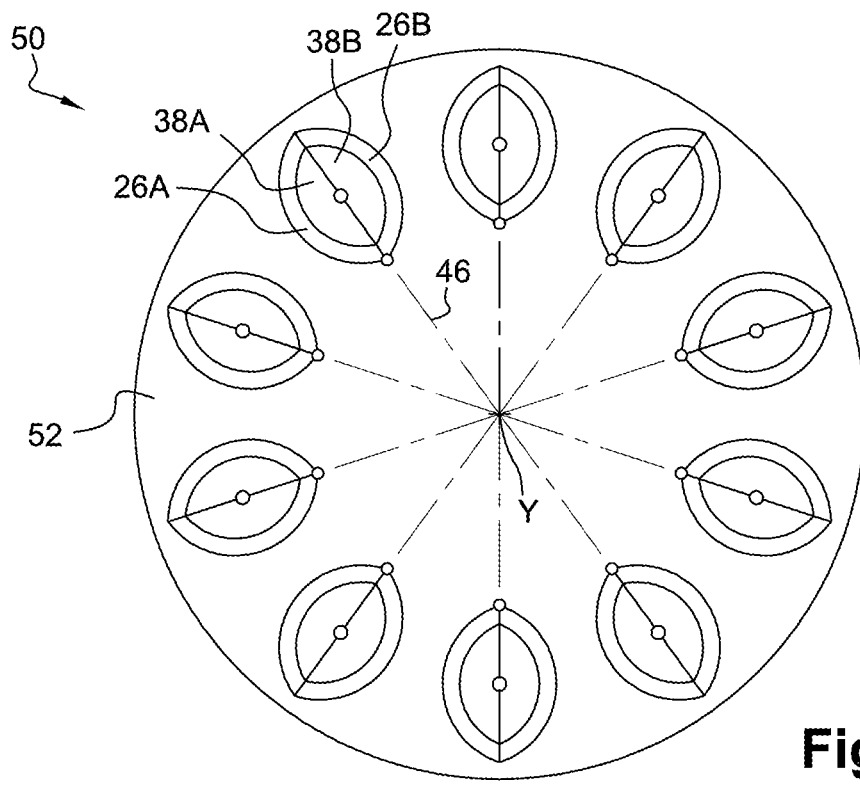
FIG. 8 is a plan view which represents a forming installation which is equipped with several molding units that are identical to those of FIG. 2.

FIG. 8 shows an installation 50 for forming thermoplastic containers by forming, and in particular by blow-molding or stretch-blow-molding, comprising a main wheel 52 mounted to rotate about a central vertical axis "Y" of rotation. The main wheel 52 comprises, at its periphery, a plurality of molding units 24, here ten of them, each produced as described previously. Each molding unit 24 is arranged so that the joint plane 44 of its half-molds 38A, 38B, in the closed position of the mold supports 26A, 26B, passes through the axis "Y" of rotation of the main wheel 52. The hinge 28 is turned toward the axis "Y" of rotation so that the molds 38A, 38B open radially outward from the main wheel 52.

As will be explained hereinbelow, the fact of producing a half-mold 38A, 38B having such an assembly face 46 very advantageously makes it possible to retain the advantages of an elliptical mold, that is to say the advantage of having a longitudinally reduced bulk, while being very quick and inexpensive to manufacture. That thus makes it possible to position a large number of molding units 24 on the periphery of the main wheel 52 without the latter then touching when they are opened. Indeed, contrary to the existing elliptical molds, each section of assembly face 46 has a unique radius of curvature in longitudinal cross-section, whereas the elliptical molds of the state of the art have a radius of curvature that changes in longitudinal cross-section.

Contrary to the elliptical molds of the state of the art, the straight lines "d1" and "d2" tangential to the transverse end of the assembly face 46 of each half-mold 38A, 38B are not of longitudinal orientation. Thus, as represented in FIG. 2, in the joined position of the half-molds 38A, 38B, said tangential straight-lines "d1, d2" form an angle "α" that is different from 180°.

According to a first embodiment of the invention represented in FIGS. 2 to 5, each half-mold 38A, 38B is a single piece, that is to say it is produced in a single piece.

To manufacture a molding assembly 34 according to this first embodiment of the invention, each raw half-mold 38A, 38B is first obtained by casting. Each raw half-mold 38A, 38B thus obtained has faces that have a rough surface condition typical of the elements obtained by this manufacturing technique. Although each raw half-mold 38A, 38B has a form very close to the final form, there is a slight excess thickness relative to the final half-molds 38A, 38B in order to be able to obtain a functional surface condition by machining involving removing a small thickness of material on each of the faces of the raw half-mold 38A, 38B.

Hereinbelow, only the machining of the assembly face 46 of each half-mold 38A, 38B is addressed. In a nonlimiting manner, the machining of the joint face 40 takes place here chronologically before the machining of the assembly face 46.

Advantageously, the assembly faces 46 of two half-molds 38A, 38B are machined simultaneously on one and the same machine tool.

Figure 9:
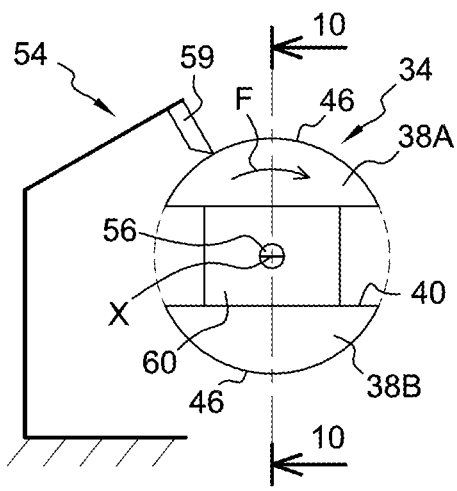
FIG. 9 is a view in longitudinal cross-section along the cutting plane 9-9 of FIG. 10 which represents the half-molds of FIG. 4 mounted in a machining lathe via a machining spacer to allow their assembly face to be machined by turning.

The assembly faces 46 are obtained by turning. As represented in FIG. 9, to this end, the machine-tool used is a machining lathe 54 which comprises a shaft 56 which is mounted to rotate about a machining axis on a base (not shown). The lathe 54 also comprises a cutting tool 59 which is intended to remove chips from the raw assembly face 46 to obtain the final assembly face 46. The cutting tool 59 is for example formed by small plates. The cutting tool 59 is mounted to rotate radially relative to the rotary shaft 56.

The half-molds 38A, 38B of the pair are arranged with their joint faces 40 facing one another, as in joined position, with the insertion of a machining spacer 60 longitudinally between the two joint faces 40 to keep the two half-molds 38A, 38B separated from one another. The spacer 60 has dimensions that are suitable for the corresponding final assembly faces 46 of the half-molds 38A, 38B to be arranged on one and the same perimeter. More particularly, the reference axes "X" of the two half-molds 38A, 38B coincide with one another. The spacer thus has a longitudinal thickness which is equal to twice the distance "s" of offset of the reference axis "X" relative to the joint face 40.

Figure 10:
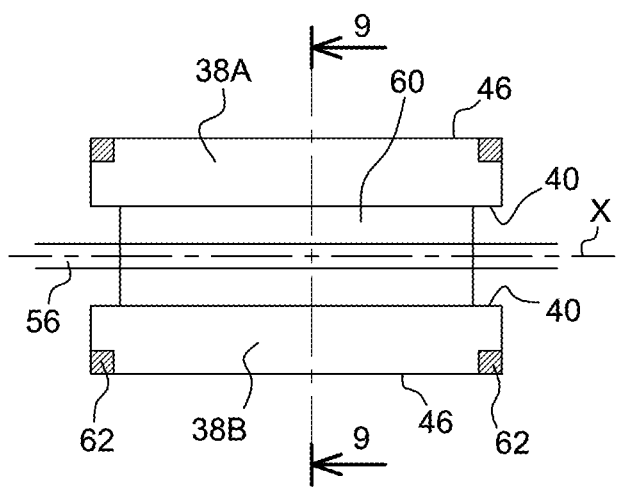
FIG. 10 is a view in axial cross section along the cutting plane 10-10 of FIG. 9.

The two half-molds 38A, 38B are for example fixed onto the spacer 60, for example by means of clamping collars 62 which are arranged at the vertical ends of each half-mold 38A, 38B as is represented in FIG. 10. The assembly of the two half-molds 38A, 38B and of the spacer 60 is then mounted on the shaft 56 of the lathe 54 so that the reference axes "X" of the assembly faces 46 of the two half-molds 38A, 38B coincide with the machining axis of the shaft 56.

When the assembly face comprises several vertical sections 46A to 46F of different dimensions but of the same reference axis "X", the vertical sections of the half-molds 38A, 38B will of course be placed coinciding with one another.

When the assembly faces of the half-molds comprise vertical sections centered on distinct reference axes, the machining operations will be performed in several steps with the use of spacers of different sizes to successively match the different reference axes with the machining axis.

Referring once again to FIG. 9, in the machining method, the half-molds 38A, 38B are driven in rotation about their coinciding reference axis "X", as indicated by the arrow "F". The cutting tool 59 is displaced radially to the desired position to remove the material on the assembly faces 46 of the two half-molds 38A, 38B as they rotate. The half-molds 38A, 38B are thus displaced along their reference axis "X" relative to the cutting tool 59 to machine all of the assembly face 46 of the two half-molds 38A, 38B in a single operation.

The machining operation is particularly fast and inexpensive compared to a milling operation.

In a variant of the invention that is not represented, it will of course be possible to use this method to produce a single half-mold by fixing only a single half-mold onto the machining spacer. In this case, it is preferable to provide counterweights on the opposite side of the spacer in order to balance the masses in the rotation of the shaft of the machining lathe.

Figure 11:
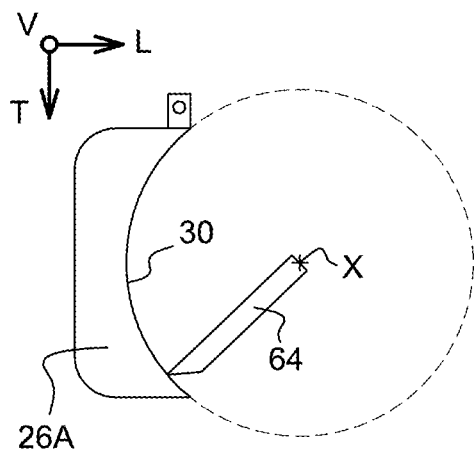
FIG. 11 is a view in longitudinal cross-section which represents a mold support produced according to the teachings of the invention, the reception face of which is being machined.

FIG. 11 represents the method for machining the inner reception face 30 of a mold support 26A produced according to the teachings of the invention. Just like the half-molds 38A, 38B, each mold support 26A, 26B is produced by casting, and its final reception face 30 is obtained by machining the raw reception face.

As has been already explained, the reception face 30 has a form complementing that of the assembly face 46 of the associated half-mold 38A, 38B. In this respect, the reception face 30 has, in longitudinal cross-section, the form of a circular arc centered on a reference axis "X".

Since the reception face 30 is concave, each section of said reception face 30 is machined using a cutting tool 64 rotating about a machining axis which coincides with the reference axis "X" of said section. The cutting tool 64 has a radius which is equal to the radius of curvature of said section.

Figure 12:
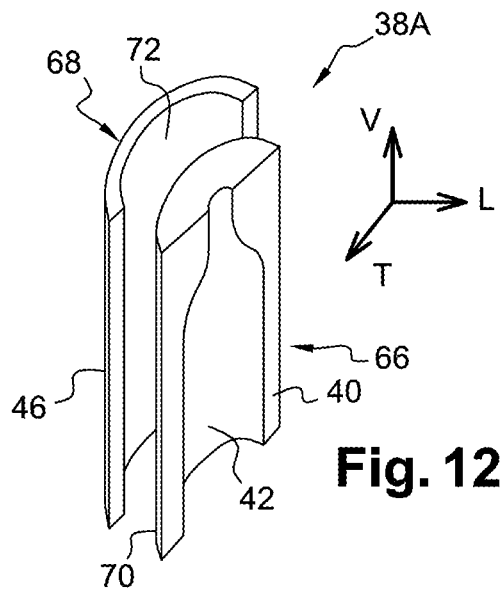
FIG. 12 is a perspective view which represents a half-mold produced in two parts according to a second embodiment of the invention.
Figure 13:
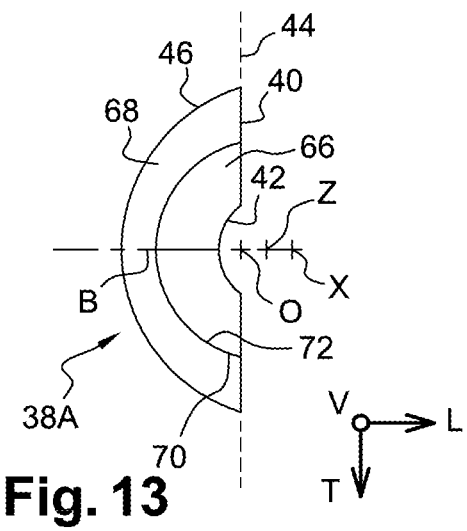
FIG. 13 is a view in longitudinal cross-section which represents the half-mold of FIG. 12 when the two parts are assembled.
Figure 14:
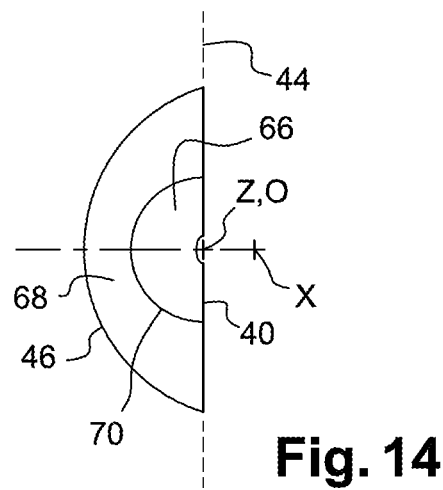
FIG. 14 is a view similar to that of FIG. 13 which represents a production variant of the second embodiment of the invention.

According to a second embodiment of the invention which is represented in FIGS. 12 to 14, each half-mold 38A, 38B is produced in two distinct parts formed by a shell 66 and a shell-holder 68.

The inner shell 66 is delimited longitudinally by a front vertical transverse face forming the joint face 40 of the half-mold 38A and by a rear face, opposite the joint face 40, forming a mounting face 70. In longitudinal cross-section, the mounting face 70 has a convex form.

The outer shell-holder 68 is delimited longitudinally by a front reception face 72 which has a form complementing that of the mounting face 70. The shell 66 is intended to be housed in the shell-holder 68, its mounting face 70 being pressed against the reception face 72 of the shell-holder 68. The shell-holder 68 is also delimited to the rear by an opposite rear face which forms the assembly face 46 of the half-mold 38A.

Thus, the shell 66 bears the molding half-cavity 42. Generally, the shell-holder 68 is equipped with cooling means (not represented) for the shell 66.

Generally, in longitudinal cross-section, the mounting face 70 of the shell 66 has the form of a circular arc centered on a vertical reference axis "Z", which does not necessarily coincide with the reference axis "X" of the assembly face 46.

According to a first production variant of the second embodiment which is represented in FIG. 14, the reference axis "Z" of the mounting face 70 is coaxial to the central axis "O" included in the joint plane 44. Thus, the mounting face 70 has, in longitudinal cross-section, the form of a half-circle.

According to a second production variant of the second embodiment which is represented in FIG. 13, the reference axis "Z" of the mounting face 70 is offset longitudinally forward relative to the joint face 40.

The reference axis "Z" of the mounting face 70 is preferably arranged in a plane including the bisector "B".

Just like the assembly face 46 which is represented in FIG. 6, the mounting face 70 can also have, overall, the form of a segment of cylinder of revolution centered on the axis "Z". In this case, the vertical cross-sections of the mounting face 70 are substantially identical in form and in dimensions regardless of the height at which they are taken. It can thus be a segment of cylinder of revolution. In this case, the mounting face 70 comprises a single reference axis "Z" that is common to all the cross-sections.

According to a variant of the invention that is not represented, the reference axis "Z" of the mounting face 70 and the reference axes "X" of the assembly face 46 are coaxial.

As a variant, just like the assembly face 46 which is represented in FIG. 7, the mounting face 70 can also comprise several vertical sections that take the form of a segment of cylinder centered on the reference axis "Z". In this case, the vertical cross-sections of the mounting face 70 are substantially identical in form, but they can differ in dimensions depending on the height at which they are taken. Thus, at least two sections of mounting face have different radii of curvature.

Preferably, the reference axes "Z" of each section of mounting face 70 are mutually coaxial. Thus, the mounting face 70 comprises a single reference axis "Z" which is common to all the cross-sections.

According to a variant of the invention that is not represented, when the mounting face comprises several vertical sections, at least two vertical sections each have non-coaxial reference axes.

In a variant of the invention that is not represented, it will be understood that a vertical section or all of the mounting face can take the form of an angular segment of any axisymmetrical volume centered on the reference axis "Z", such as a frustum.

To manufacture a shell 66 or a shell-holder 68, the method is the same as for manufacturing a single-piece half-mold 38A produced according to the first embodiment of the invention.

Thus, each raw shell 66 or shell-holder 68 is first obtained by casting. Each raw shell 66 or shell-holder 68 thus obtained has faces having a rough surface state that is typical of the elements obtained by this manufacturing technique. Although each raw shell 66 or shell-holder 68 has a form very close to the final form, a slight excess thickness is provided relative to the final shells 66 or shell-holders 68 in order to be able to obtain a functional surface condition by machining involving removing a small thickness of material on each of the faces of the raw shell 66 or shell-holder 68.

The machining of the mounting face 70 of the shell 66 and the machining of the assembly face 46 of the shell-holder 68 are performed according to a method that is identical to that which has been described for the production of the assembly face 46 of a single-piece half-mold 38A. In this respect, reference will be made to the description which was given with reference to FIGS. 9 and 10, replacing the single-piece "half-mold 38A" element with the "shell 66" element or the "shell-holder 68" element.

Likewise, the machining of the reception face 72 of the shell-holder 68 is performed in the same way as was described in the first embodiment for the machining of the reception face 30 of the mold support 26A with reference to FIG. 11. In this respect, reference will be made to the description which was given with reference to FIG. 11, replacing the "mold support 26A" element with the "shell-holder 68" element.

The invention claimed is:

1. A half-mold (38A, 38B) for forming containers made of thermoplastic material of vertical orientation axis, notably by blow-molding or stretch blow-molding, the half-mold (38A, 38B) comprising:
    a planar vertical transverse front joint face (40) provided with a molding half-cavity (42);
    a vertical assembly face (46) that is opposite, in the longitudinal direction, the joint face (40) and has a convex curve, the assembly face (46) being intended to be housed in a complementary reception face (30) of an associated mold support (26A, 26B);
    wherein, in longitudinal cross-section, the assembly face (46) has the form of a circular arc centered on a reference axis (X), said reference axis (X) being offset longitudinally forward relative to the joint face (40).

2. The half-mold (38A, 38B) as claimed in claim 1, wherein the assembly face (46) comprises several vertical sections (46A, 46B, 46C, 46D, 46E, 46F) in the form of a cylinder segment centered on the reference axis (X).

3. The half-mold (38A, 38B) as claimed in claim 1, wherein the assembly face (46) has, in longitudinal cross-section:
    a transverse chord (C) extending in the plane of the joint face (40) linking the free transverse ends of the assembly face (46); and
    a longitudinal bisector (B) passing through the center (O) of the chord (C) and of a length less than half that of the chord (C),
    a central vertical axis (O) of the half-mold (38A, 38B) passing through the intersection between the chord (C) and the bisector (B);
    the reference axis (X) being arranged in a plane including the bisector (B).

4. The half-mold (38A, 38B) as claimed claim 2, wherein the reference axes (X) of each section (46A, 46B, 46C, 46D, 46E, 46F) of assembly face (46) are mutually coaxial.

5. The half-mold (38A, 38B) as claimed in claim 4, wherein at least two sections (46A, 46B) of assembly face (46) have different radii of curvature.

6. The half-mold (38A, 38B) as claimed in claim 1, wherein the half-mold (38A, 38B) is a single piece.

7. The half-mold (38A, 38B) as claimed in claim 1, wherein the half-mold (38A, 38B) comprises:
    an inner shell (66) which is longitudinally delimited a front face forming the joint face (40) of the half-mold (38A, 38B) and by a rear face, opposite the joint face (40), and forming a mounting face (70) of convex form;
    an outer shell-holder (68) which is delimited longitudinally by a front reception face (72) of a form complementing that of the mounting face (70) and in which the mounting face (70) of the shell (66) is housed and by an opposite rear face which forms the assembly face (46) of the half-mold (38A, 38B).

8. The half-mold (38A, 38B) as claimed in claim 7, wherein, in longitudinal cross-section, the mounting face (70) of the shell (66) has the form of a circular arc centered on a reference axis (Z).

9. The half-mold (38A, 38B) as claimed in claim 8, wherein the reference axis (Z) of the mounting face (70) is coaxial to the central axis (O) included in the plane of the joint face (40).

10. The half-mold (38A, 38B) as claimed in claim 8, wherein the reference axis (Z) of the mounting face (70) is offset longitudinally forward relative to the joint face (40).

11. The half-mold (38A, 38B) as claimed in claim 10, wherein the mounting face (70) of the shell (66) comprises several vertical sections having the form of a cylinder segment centered on the reference axis (Z) of the mounting face (70).

12. The half-mold (38A, 38B) as claimed in claim 8, wherein the reference axis (Z) is arranged in a plane including the longitudinal bisector (B).

13. The half-mold (38A, 38B) as claimed in claim 8, wherein the reference axes (Z) of each section of mounting face (70) are mutually coaxial.

14. The half-mold (38A, 38B) as claimed in claim 13, wherein at least two sections of mounting face (70) have different radii of curvature.

15. The half-mold (38A, 38B) as claimed claim 8, wherein the reference axes (Z) of the sections of mounting face (70) and the reference axes (X) of the sections of assembly face are all coaxial to a common axis (X).

16. A molding assembly (34) comprising a pair of half-molds (38A, 38B) produced as claimed in claim 1, wherein the two half-molds (38A, 38B) of the pair comprise two complementary half-cavities (42) to form a cavity conforming to the final container to be obtained when the two half-molds (38A, 38B) occupy a joined position in which their two joint faces (40) are pressed longitudinally against one another.

17. The molding assembly (34) as claimed in claim 16, wherein the two half-molds (38A, 38B) have a structure that is substantially identical by symmetry relative to a joint plane (44) passing through the joint faces (40) in the joined position of the two half-molds (38A, 38B).

18. A molding unit (24) comprising two mold supports (26A, 26B), each of which is intended to receive one of the half-molds (38A, 38B) of a molding assembly (34) produced as claimed in claim 17, the mold supports (26A, 26B) being mounted to be mobile relative to one another between an open position, in which the joint faces (40) of the half-molds (38A, 38B) are separated, and a closed position in which the half-molds (38A, 38B) occupy their joined position, characterized in that each mold support (26A, 26B) comprises a reception face (30) of a form complementing the assembly face (46) of the associated half-mold (38A, 38B).

19. The molding unit (24) as claimed in claim 18, wherein the two mold supports (26A, 26B) are mounted to pivot relative to one another about a vertical hinge axis (A), the joint plane (44) of the half-molds (38A, 38B) passing through the hinge axis (A).

20. An installation (50) for forming thermoplastic containers by forming, and notably by blow-molding or stretch blow-molding, comprising a main wheel (52) mounted to rotate about a central axis (Y) of rotation and comprising, at its periphery, a plurality of molding units (24) produced as claimed in claim 19, wherein the joint plane (44) of the half-molds (38A, 38B) of each molding unit (24) passes through the central axis (Y) of rotation of the main wheel (52).

21. A method for machining the outer faces of a pair of molding elements of a molding assembly (34) as claimed in claim 17 among the mounting faces (70) of the shells (66) or the assembly faces (46) of the shell-holders (68) or the assembly faces (46) of the single-piece half-molds (38A, 38B), the molding elements being obtained by casting, wherein the molding elements of the pair are mounted on a machining spacer (60) mounted to rotate on a machining lathe (54) about a machining axis, so that the reference axes (X, Z) of the sections to be machined coincide with the machining axis.

22. A method for machining the reception face (30) of a mold support (26A, 26B) or the inner reception face (72) of a shell-holder (68) produced as claimed in claim 7, wherein each section of said inner face is machined by means of a cutting tool (64) rotating about a machining axis which coincides with the reference axis (X, Z) of said section, the cutting tool (64) having a radius which is equal to the radius of curvature of said section.

* * * * *